United States Patent
Factor et al.

(10) Patent No.: US 8,489,799 B2
(45) Date of Patent: Jul. 16, 2013

(54) EFFICIENT LOADING OF DATA INTO MEMORY OF A COMPUTING SYSTEM

(75) Inventors: Michael E. Factor, Haifa (IL); Kalman Z. Meth, Netanya (IL)

(73) Assignee: International Business Machines Corporation, Armonk, NY (US)

( * ) Notice: Subject to any disclaimer, the term of this patent is extended or adjusted under 35 U.S.C. 154(b) by 761 days.

(21) Appl. No.: 12/636,743

(22) Filed: Dec. 13, 2009

(65) Prior Publication Data

US 2011/0145534 A1    Jun. 16, 2011

(51) Int. Cl.
*G06F 12/00*    (2006.01)
(52) U.S. Cl.
USPC ............. 711/6; 711/156; 711/162; 711/216
(58) Field of Classification Search
None
See application file for complete search history.

(56) References Cited

U.S. PATENT DOCUMENTS

| | | | |
|---|---|---|---|
| 6,760,828 B1 | 7/2004 | Black | |
| 6,789,156 B1 | 9/2004 | Waldspurger | |
| 6,915,397 B2 | 7/2005 | Lubbers et al. | |
| 7,246,200 B1 | 7/2007 | Van Rietschote et al. | |
| 7,356,665 B2 | 4/2008 | Rawson | |
| 7,496,613 B2 | 2/2009 | Raghunath | |
| 7,500,048 B1 | 3/2009 | Venkitachalam et al. | |
| 8,099,571 B1 * | 1/2012 | Driscoll et al. | 711/162 |
| 8,135,918 B1 * | 3/2012 | Yueh | 711/147 |
| 2004/0254964 A1 | 12/2004 | Kodama et al. | |
| 2006/0174074 A1 | 8/2006 | Banikazemi et al. | |
| 2008/0263296 A1 | 10/2008 | Ben-Yehuda et al. | |
| 2008/0281967 A1 | 11/2008 | Muhlestein et al. | |
| 2009/0182928 A1 | 7/2009 | Becker et al. | |
| 2009/0204718 A1 | 8/2009 | Lawton et al. | |

OTHER PUBLICATIONS

"VMware Unveils New vStorage Technologies to Deliver Leading Efficiency and Manageability for the Virtual Datacenter Operating System", vStorage APIs, VMware News Release, 2009.

* cited by examiner

*Primary Examiner* — Shawn X Gu
(74) *Attorney, Agent, or Firm* — F. Jason Far-hadian; Century IP Group

(57) ABSTRACT

A method for deploying one or more virtual machines on a host computing system is provided. The method comprises receiving mapping information from a data storage system. The mapping information associates a first data chunk stored in the data storage system with a unique identifier to support deployment of a first virtual machine on a host computing system. Once the mapping information is received, the mapping information is utilized to determine whether any copies of the first data chunk have already been loaded into a memory of the host computing system in association with deployment of the first virtual machine or a second virtual machine on the host computing system. If no copies of the first data chunk have already been loaded into the memory, the first data chunk is retrieved from the data storage system, loaded into the memory, and utilized to deploy the first virtual machine on the host computing system.

17 Claims, 5 Drawing Sheets

EFFICIENT LOADING OF DATA INTO MEMORY OF A COMPUTING SYSTEM

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of the claimed subject matter to material associated with such marks.

TECHNICAL FIELD

The disclosed subject matter relates generally to computing systems and, more particularly, to efficient loading of data into memory of a computing system hosting a plurality of virtual machines.

BACKGROUND

In a virtualization environment, a host software (i.e., a hypervisor) running on one or more software or hardware infrastructures (i.e., a host machine) may emulate, or virtualize, the host machine for one or more guest software. In other words, a hypervisor may implement one or more virtual machines (VMs).

The hypervisor implements the VMs by loading data utilized to implement the VMs (i.e., images of the VMs) from a data storage system into a memory of the host machine. If the images are derived from the same image (i.e., a master image), the images may have a significant amount of data in common. In existing implementations, the hypervisor retrieves and loads each of the images independently into a separate region of the memory without identifying the data that is common to the multiple VM images. Thus, the hypervisor wastes resources (e.g., processing power, memory space, storage and network bandwidth) by repeatedly retrieving and loading the common data.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one embodiment, a method for deploying one or more virtual machines on a host computing system is provided. The method comprises receiving mapping information from a data storage system. The mapping information associates a first data chunk stored in the data storage system with a unique identifier to support deployment of a first virtual machine on a host computing system. Once the mapping information is received, the mapping information is utilized to determine whether any copies of the first data chunk have already been loaded into a memory of the host computing system in association with deployment of the first virtual machine or a second virtual machine on the host computing system. If no copies of the first data chunk have already been loaded into the memory, the first data chunk is retrieved from the data storage system, loaded into the memory, and utilized to deploy the first virtual machine on the host computing system.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXEMPLARY EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
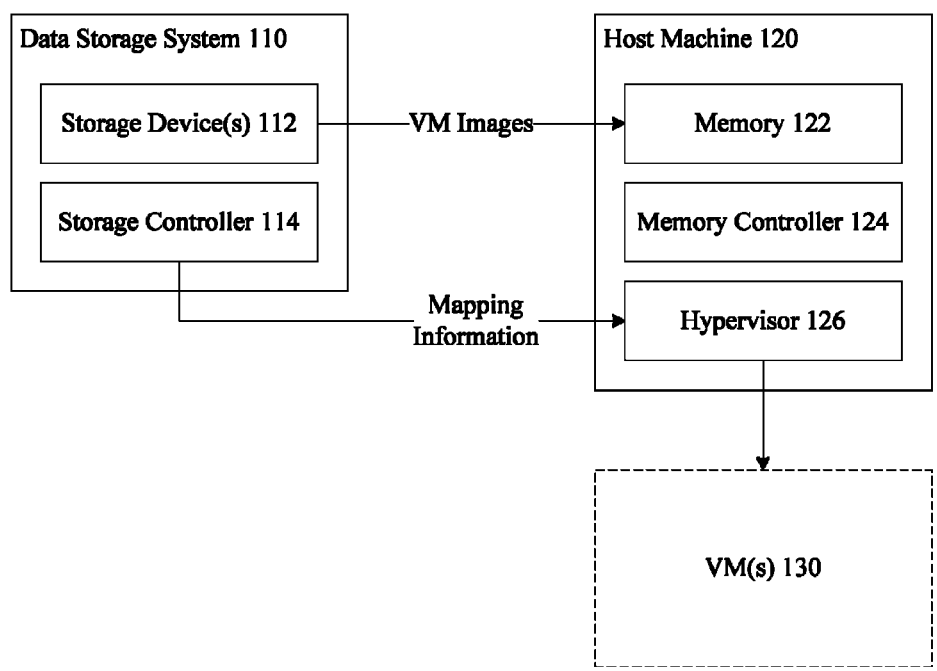
FIG. 1 illustrates an exemplary virtualization environment, in accordance with one or more embodiments.

Referring to FIG. 1, in accordance with one or more embodiments, an exemplary virtualization environment 100 comprises a data storage system 110 and a host machine 120. The data storage system 110 includes one or more storage devices 112 for storing data and a storage controller 114 for managing data. The host machine 120 includes a memory 122 for storing data, a memory controller 124 for managing data, and a hypervisor 126 for implementing one or more VMs 130.

Figure 2A:
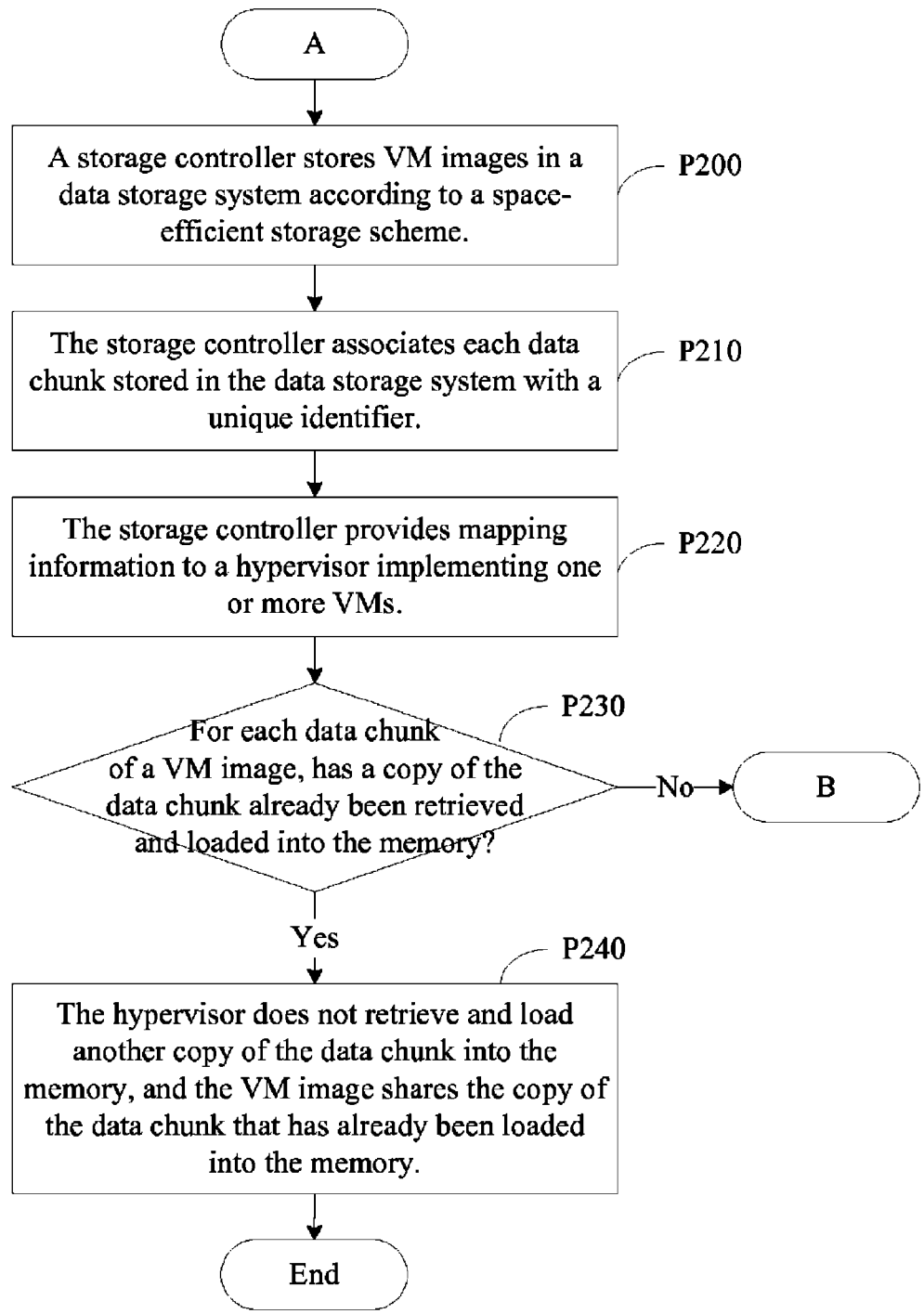
FIGS. 2A and 2B are flow diagrams of a method for retrieving and loading one or more VM images into memory, in accordance with one embodiment.
Figure 2B:
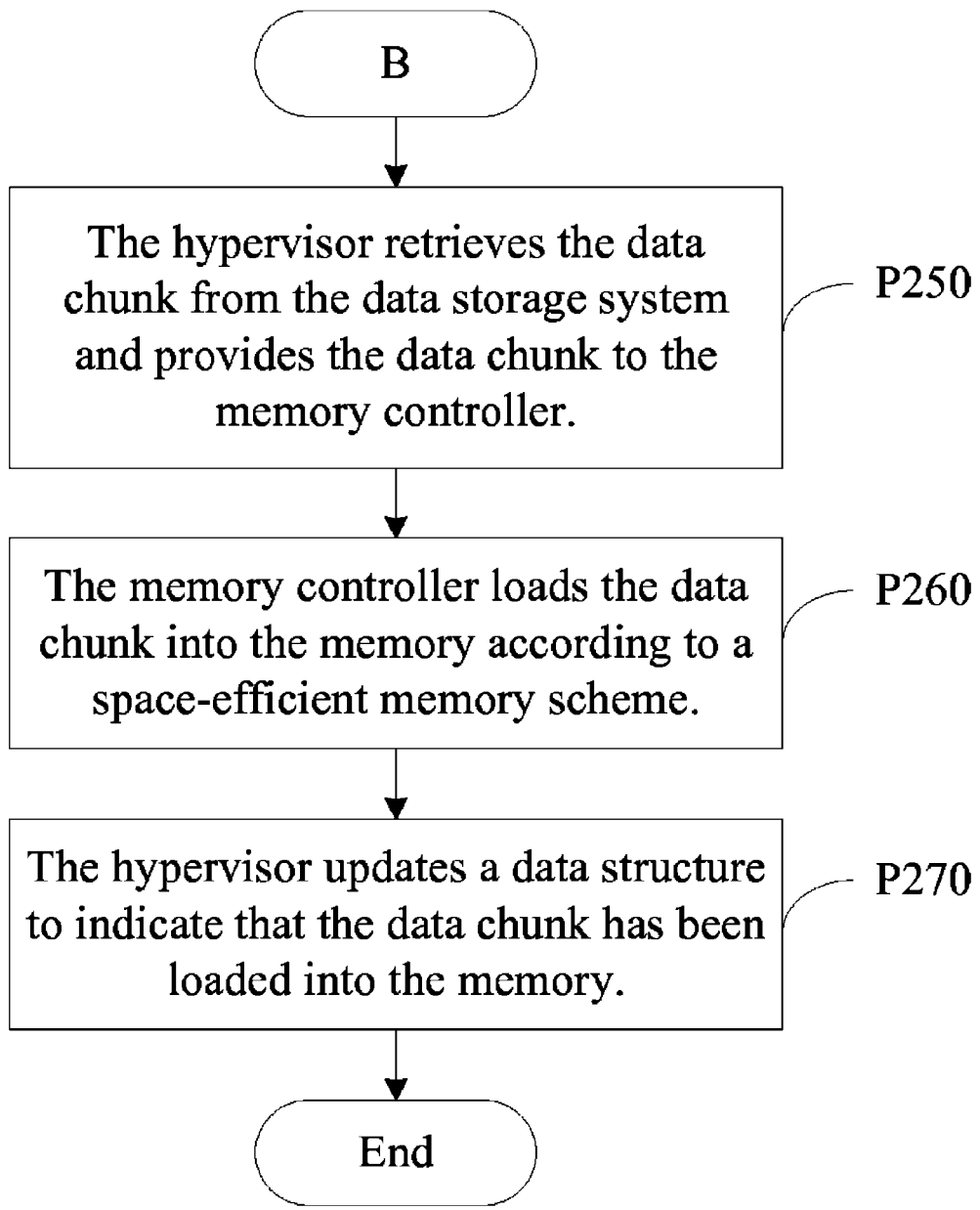

Referring to FIGS. 1, 2A, and 2B, in accordance with one embodiment, data utilized to implement the VMs 130 (i.e., VM images) may be retrieved from the storage devices 112 and loaded into the memory 122. The storage controller 114 stored the VM images in the storage devices 112 according to a storage scheme that uses copy-on-write, de-duplication, or other space-efficient storage mechanism to prevent or eliminate multiple copies of commonly shared data from being stored in the data storage system 110 (P200). It is noteworthy that the VM images may have a significant amount of data in common if the VM images are derived from a master image. In one implementation, for example, a VM image may be derived from a master image by generating a space-efficient point-in-time copy (e.g., a snapshot) of the master image and then modifying the copy.

Each data chunk stored in the data storage system 110 may be advantageously associated with a unique identifier (P210). A data chunk refers to a data block, a data extent, or other grouping of data. Depending on implementation, a unique identifier associated with a data chunk may be generated according to the storage location, according to the content of the data chunk, or other mechanism for generating such an identifier. Thus, in some implementations, copies of a data chunk that are stored in the same storage location or have the same content may be associated with the same unique identifier.

In an exemplary embodiment, when copy-on-write is used to store a point-in-time copy of a data chunk, one or more copies of the data chunk may be stored in a first or second storage volume depending on whether the data chunk has been modified after a certain point in time. In such a storage scheme, a unique identifier for an unmodified copy of the data chunk may comprise an identifier for the first storage volume and the location of the copy within the first storage volume, for example. A unique identifier for a modified copy of the data chunk may comprise an identifier for a second storage volume and the location of the copy within the second storage volume, for example.

In other storage schemes, a unique identifier for a data chunk may comprise the physical address of the data chunk, for example. Alternatively, a unique identifier for a data chunk may comprise a hash value or other value generated from the content of the data chunk, for example.

Still referring to FIGS. 1, 2A, and 2B, the storage controller 114 provides hypervisor 126 with information (i.e., mapping information) associating each data chunk of the VM images with a unique identifier (P220). Depending on implementation, such mapping information may be obtained by the hypervisor 126 either by the hypervisor 126 sending an explicit request to the storage controller 114 for such information or by being piggybacked on other traffic that is flowing from the storage controller 114 to the hypervisor 126, or any other available means for obtaining such information. It should be understood that the disclosed subject matter is not limited to a specific implementation.

For each data chunk of a VM image that is to be retrieved from the data storage system 110 and loaded into the memory 122, the hypervisor 126 utilizes the unique identifier associated with the data chunk to determine whether a copy of the data chunk has already been retrieved and loaded into the memory 122 as part of deploying a first VM image (i.e., the current VM image) or second VM image (i.e., a previous deployed VM image) (P230). If a copy of the data chunk has already been retrieved and loaded into the memory 122, a second copy of the same data chunk will not be retrieved and loaded into the memory 122 for the purpose of deploying the first VM image. Instead, the first VM image shares the copy of the data chunk that has already been loaded into the memory 122 (P240). Alternatively, the hypervisor 126 requests the memory controller 124 to perform a memory-to-memory copy of the data chunk instead of retrieving the data chunk again from the data storage system 110.

If a previous copy of the data chunk has not been retrieved and loaded into memory 122, the hypervisor 126 retrieves the data chunk from the data storage system 110 and provides the data chunk to the memory controller 124 (P250). Upon receiving the data chunk, the memory controller 124 loads the data chunk into the memory 122 using a space-efficient memory scheme that prevents or eliminates multiple copies of the commonly shared data from being stored in the memory 122 (P260). Once the data chunk is loaded into the memory 122, the hypervisor 126 updates a data structure (e.g., a table, an array, a bitmap, etc.) to indicate that the data chunk has been loaded into the memory 122 (P270).

In certain implementations, a VM may be modified due to a change in the state of the VM. If so, a data chunk for a first VM that is commonly shared between the first VM and the second VM may be modified after being loaded into the memory 122. In such implementations, the hypervisor 124 may update the unique identifier associated with the data chunk loaded into the memory 122 to include a timestamp or version number, for example, to distinguish the data chunk as being associated with the first VM and not the second VM. In this scenario, if the second VM has been already deployed, then a copy of the data chunk prior to the modification is reserved and loaded in association with the second VM. Alternatively, the hypervisor 120 may prohibit the data chunk from being modified while the data chunk is in use.

The processes provided above prevent copies of the same data that are stored in different storage volumes of a data storage system from being retrieved from storage and loaded into memory more than once. Thus, data is retrieved and loaded into memory without wasting processing power (e.g., input/output (I/O) operations), memory space, or storage and network bandwidth. Also, the processes provided above may be applied to any type of data that may be loaded from a set of storage volumes into memory of any type of computing system. Therefore, the scope of the claimed subject matter should not be construed as being limited to loading VM images into memory of a computing system hosting VMs.

In different embodiments, the disclosed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 3:
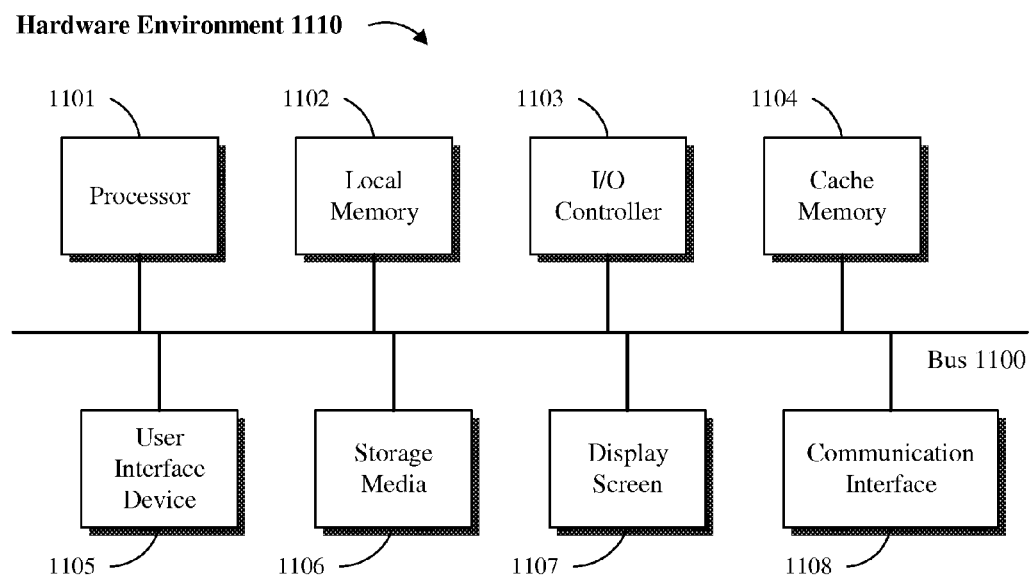
FIGS. 3 and 4 are block diagrams of hardware and software environments in which a system of the present invention may operate, in accordance with one or more embodiments.
Figure 4:
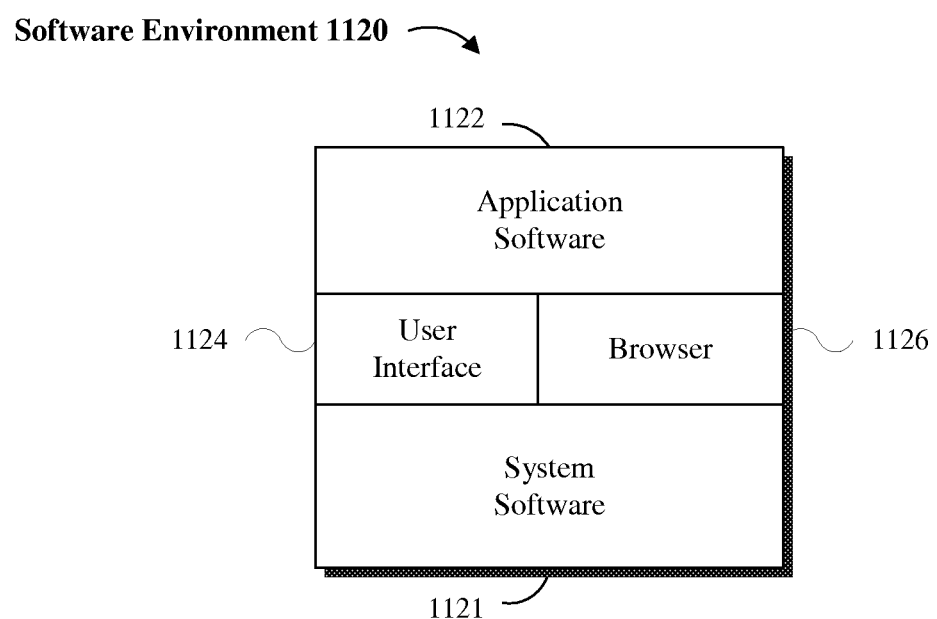

Referring to FIGS. 3 and 4, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 3, the application software and logic code disclosed herein may be implemented in the form of computer readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other computer-usable or computer readable media. Within the context of this disclosure, a computer usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-Ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a computer-usable or computer readable storage medium that provides program code for use by, or in connection with, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable storage medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The disclosed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A system for loading a set of data into a memory of a host computing system wherein the host computing system comprises one or more processors, the system comprising:
   a logic unit in the host computing system for receiving mapping information from a data storage system, wherein the mapping information associates a first data chunk stored in the data storage system with a unique identifier to support loading a first set of data comprising the first data chunk into the memory of the host computing system, wherein the loading of the first data chunk into the memory of the host computing system at least partially supports deployment of a first virtual machine on the host computing system;
   a logic unit for utilizing the mapping information to determine whether a copy of the first data chunk has already been loaded into the memory in association with loading a second set of data from the data storage system into the memory, and
   a logic unit for retrieving the first data chunk from the data storage system and loading the first data chunk into memory, in response to determining that no copies of the first data chunk have already been loaded into the memory,
   wherein a first unique identifier is used to identify location of the first data chunk in the data storage system and a second unique identifier is used to identify location of a first copy of the first data chunk in the memory, such that the first virtual machine is at least partially deployable from the first copy of the first data chunk in the memory without having to load the first data chunk from the data storage system to the memory.

2. The method of claim 1, further comprising utilizing the first copy of the first data chunk already loaded into the memory to deploy the first virtual machine on the host computing system, in response to determining that at least the first copy of the first data chunk has already been loaded into the memory.

3. The method of claim 1, further comprising utilizing a second copy of the first data chunk generated from the first copy of the first data chunk already loaded into the memory, in response to determining that at least the first copy of the first data chunk has already been loaded into the memory.

4. The method of claim 1, wherein the first data chunk is stored in the data storage system according to a space-efficient storage scheme.

5. The method of claim 1, wherein the first data chunk is stored in the memory according to a space-efficient memory scheme.

6. The method of claim 1, wherein the unique identifier associated with the first data chunk is generated based on a storage location of the first data chunk.

7. The method of claim 6, wherein the unique identifier associated with the first data chunk comprises an identifier for a first storage volume in the data storage system and a location of the first data chunk within the first storage volume, if the first data chunk is not modified after a certain point in time.

8. The method of claim 6, wherein the unique identifier associated with the first data chunk comprises an identifier for a second storage volume in the data storage system and a location of the first data chunk within the second storage volume, if the first data chunk is modified after a certain point in time.

9. The method of claim 1, wherein the first unique identifier used to identify location of the first data chunk comprises a physical address of the first data chunk.

10. The method of claim 9, wherein the first unique identifier is generated based on content of the first data chunk.

11. The method of claim 10, wherein the unique identifier comprises a hash value generated from the content of the first data chunk.

12. The method of claim 1, wherein the first data chunk is stored in the data storage system using copy-on-write and shared by the first virtual machine and the second virtual machine.

13. The method of claim 12, wherein a copy of the first data chunk is generated prior to modifying the first data chunk in the data storage system so that the unmodified copy of the first data chunk is available to deploy the second virtual machine.

14. The method of claim 12, wherein the unique identifier associated with the first data chunk is updated in the data storage system, in response to modifying the first data chunk in the data storage system.

15. The method of claim 1, wherein the first data chunk is stored in the memory using copy-on-write and shared by the first virtual machine and the second virtual machine.

16. The method of claim 15, wherein a copy of the first data chunk is generated in the memory prior to modifying the first data chunk in the memory so that the unmodified copy of the first data chunk is available to deploy the second virtual machine.

17. The method of claim 16, wherein the unique identifier associated with the first data chunk is updated in the memory, in response to modifying the first data chunk in the memory.

* * * * *